(12) United States Patent
Shim

(10) Patent No.: US 7,230,255 B2
(45) Date of Patent: Jun. 12, 2007

(54) PHOTOCATALYST STERILIZER

(76) Inventor: Jong-Seob Shim, Hoban Apt 102-503, Singa-Dong, Kwangsan-Gu, Gwangju 506-307 (KR)

( * ) Notice: Subject to any disclaimer, the term of this patent is extended or adjusted under 35 U.S.C. 154(b) by 0 days.

(21) Appl. No.: 10/559,117

(22) PCT Filed: Jun. 4, 2004

(86) PCT No.: PCT/KR2004/001339

§ 371 (c)(1),
(2), (4) Date: Dec. 2, 2005

(87) PCT Pub. No.: WO2004/108605

PCT Pub. Date: Dec. 16, 2004

(65) Prior Publication Data

US 2006/0124860 A1    Jun. 15, 2006

(30) Foreign Application Priority Data

Jun. 4, 2003 (KR) .................. 20-2003-0017586
Jan. 16, 2004 (KR) .................. 10-2004-0003453
Feb. 3, 2004 (KR) .................. 10-2004-0006860

(51) Int. Cl.
*G01N 23/12* (2006.01)
(52) U.S. Cl. .................. 250/453.11; 250/432 R; 204/157; 204/15; 422/186.3; 210/695; 210/209
(58) Field of Classification Search .............. None
See application file for complete search history.

(56) References Cited

U.S. PATENT DOCUMENTS 5,597,482 A * 1/1997 Melyon ................ 210/209
6,558,553 B1    5/2003 Amal et al.
2005/0224335 A1* 10/2005 Carmignani et al. ... 204/157.15

FOREIGN PATENT DOCUMENTS

| DE | 10057722 | 5/2002 |
|---|---|---|
| JP | 08-047687 | 2/1996 |
| JP | 08-0666677 | 3/1996 |
| JP | 10244257 A * | 3/1997 |
| JP | 10-066878 | 3/1998 |
| KR | 20178034 | 4/2000 |
| KR | 00-073946 | 12/2000 |
| KR | 03-034742 | 5/2003 |

* cited by examiner

*Primary Examiner*—Jack Berman
*Assistant Examiner*—Zia R. Hashmi
(74) *Attorney, Agent, or Firm*—IPLA P.A.; James E. Bame

(57) ABSTRACT

The present invention provides a photocatalyst sterilizer (200) which draws thereinto water, contained in a water tank (120) and polluted by bacilli and various organic substances, regardless of a water level in the water tank (120) and sterilizes the polluted water using violet rays and through a photocatalyst reaction, thus enhancing a sterilizing ability thereof, and which is easily installed and efficiently used in various appliances, which are necessary to execute sterilizing processes, for example, hot and cold water generators, hot and cold water purifiers, tap water purifiers to be directly coupled to faucet pipes, edible water purifiers, and aquariums.

18 Claims, 12 Drawing Sheets

(a)

(b)

(a)

(b)

PHOTOCATALYST STERILIZER

TECHNICAL FIELD

The present invention relates to photocatalyst sterilizers and, more particularly, to a photocatalyst sterilizer which draws thereinto water, contained in a water tank and polluted by bacilli and various organic substances, regardless of a water level in the water tank and sterilizes the polluted water using violet rays and through a photocatalyst reaction, thus enhancing a sterilizing ability thereof and which is easily installed and efficiently used in various appliances, which are necessary to execute sterilizing processes, for example, hot and cold water generators, hot and cold water purifiers, tap water purifiers to be directly coupled to faucet pipes, edible water purifiers, and aquariums.

BACKGROUND ART

As examples of edible water purifiers which have been widely used in home or office, there are tap water purifiers which filtrate city water with solid or organic materials using a plurality of purifying filters to supply clean water to users, hot and cold water purifiers which purify water and selectively cool or heat the purified water to supply edible water to the users, and hot and cold water generators on which large-sized water bottles containing therein raw water are put so that the raw water supplied from the large-sized water bottles into water tanks of the water generators is selectively cooled or heated for the users.

In the above-mentioned edible water purifiers, the tap water purifiers to be directly coupled to faucet pipes each include a base which has both a water feed hole and a clean water discharging hole, a cylindrical housing which is provided on an upper part of the base, a purifying filter which is provided in the housing, and a filter cartridge with a head provided on an upper part of the housing. The conventional tap water purifiers are individually coupled at the feed water hole thereof to a faucet pipe. Thus, the city water fed from the faucet pipe is purified by the plurality of purifying filters prior to being discharged through a clean water discharging hole to the outside.

However, with the passage of time, a great quantity of impurities are deposited on the purifying filters. Thus, the filtering abilities of the conventional water purifiers are deteriorated. Therefore, the conventional purifiers force the users to periodically change filter cartridges with new ones. Due to frequent replacements of the filter cartridges, the conventional water purifiers cause inconvenience to the users and impose additional expenses on the users.

The hot and cold water generators and the hot and cold water purifiers each include a water tank which has a structure enabling storage of raw water or clean water of about 10~20 liters. Each of both the hot and cold water generator and the hot and cold water purifier draws thereinto air from the outside to smoothly discharge the water.

However, in each of both the conventional hot and cold water generator and the conventional hot and cold water purifier, the water contained in the water tank may be processes by passing through a purifying filter, which is not changed with a new one even after a predetermined period is passed. In the above state, the processed water may be polluted by the contaminated purifying filter used for the long period. Furthermore, even though the city water is processed by passing through a fresh purifying filter, or the raw water is sanitarily processed, the water contained in the water tank may be contaminated by various harmful bacilli, because the bacilli along with the air may be drawn into the water tank through an air inlet. Thus, the water discharged from the conventional water generators or purifiers may not be suitable for drinking. In case of the conventional hot and cold water generators, the user can observe a state of the contaminated water tank with the naked eye. Thus, the user can periodically clean the water tank or put a germicidal agent in the water tank However, in case of the conventional hot and cold water purifiers, the water tank is typically installed in a casing of the water purifier. Thus, most users use the water purifiers without cleaning the interiors of the water tanks before the purifying filters are changed with new ones. Therefore, the hot and cold water purifier used for a long period is more seriously contaminated by the bacilli. In the above state, the water, processed by the conventional hot and cold water purifier used for a long period, may be worse in quality by the bacilli than the water which is not purified, thereby the processed water may be bad for the health In an effort to overcome the problem in that the water is contaminated by the bacilli, a technique in that an ultraviolet sterilizer is provided in the water tank of an edible water purifier to prevent the bacilli from being generated and propagated was proposed.

The conventional ultraviolet sterilizer includes a quartz tube with an UV (ultraviolet) lamp, a sleeve which has therein the quartz tube, a holder which fastens thereon both ends of the sleeve and supports thereon the quartz tube, and a housing which has therein the sleeve and provides both a water inlet and a water outlet. The conventional ultraviolet sterilizer can sterilize bacilli by ultraviolet rays having wavelengths of 254 mm, but is problematic as follows.

First, because the ultraviolet rays penetrate water to 1~2 mm, only water, placed around an outer surface of the quartz tube having therein the UV lamp, is sterilized. Thus, the conventional ultraviolet sterilizer cannot sterilize the whole of the water contained in the water tank.

Second, the edible water purifier with the conventional ultraviolet sterilizer may supply water of a state, in which the water sterilized by the sterilizer is mixed with the water which is not sterilized, to the users. Thus, the user may be injured.

Third, in case that the water level in the water tank is low, the sterilizing ability of the ultraviolet sterilizer is deteriorated.

Fourth, the conventional ultraviolet sterilizer is problematic in that the ultraviolet rays cannot dissolve or eliminate various organic materials, such as environmental hormone, etc.

DISCLOSURE OF THE INVENTION

Accordingly, the present invention has been made keeping in mind the above problems occurring in the prior art, and an object of the present invention is to provide a photocatalyst sterilizer which draws thereinto water, contained in a water tank and polluted by bacilli and various organic substances, regardless of a water level in the water tank and sterilizes the polluted water using violet rays and through a photocatalyst reaction, thus enhancing a sterilizing ability, and which is easily installed and efficiently used in various appliances, which are necessary to execute sterilizing processes, for example, hot and cold water generators, hot and cold water purifies, tap water purifiers, edible water purifiers, and aquariums.

In order to accomplish the above object the present invention provides a photocatalyst sterilizer, including, an upper cap having a cylindrical shape having an upper cylindrical cap part and a lower cylindrical cap part having a diameter smaller than that of the upper cylindrical cap part and integrally provided under a lower end of the upper cylindrical cap part; a quartz tube fastened at an upper end thereof in the upper cap, with an UV (ultraviolet) lamp provided in the quartz tube; an inner pipe fastened at an upper end thereof in the upper cap and provided around an outer surface of the quartz tube to be spaced apart from each other at a predetermined interval, so as to discharge water, fed from the upper end thereof through a lower end thereof to an outside of the inner pipe; a photocatalyst-coated carrier provided between the quartz tube and the inner pipe; and an outer pipe fastened at an upper end thereof in the upper cap and provided around an outer surface of the inner pipe to be spaced apart from each other at a predetermined interval, so as to feed water, drawn though a lower end thereof, to the upper end of the inner pipe.

The inner pipe may be made of glass or a quartz material, and the outer pipe may be made of one of glass, quartz, stainless steel, silver, silver-plated metals and aluminum.

The lower cylindrical cap part may include a plurality of guide grooves longitudinally provided around an outer surface of the lower cylindrical cap part to be spaced apart from each other at predetermined intervals; a water passing hole to communicate each of the plurality of guide grooves with the upper end of the inner pipe; and an inner stepped part provided under the water passing holes on a lower end of an inner sure of the lower cylindrical cap part. The inner pipe may have a longitudinal cylindrical shape with a constant diameter and may be in close contact at the upper end thereof with the inner stepped part.

The photocatalyst sterilizer may further include a skirt part extending downward from a lower end of the upper cylindrical cap part while being spaced apart from the outer surface of the lower cylindrical cap part at a predetermined interval, so that an upper end of the outer pipe is in close contact with an inner surface of the skirt part.

The photocatalyst sterilizer may further include a lower cap provided under both the lower end of the inner pipe and the lower end of the outer pipe to feed the water into an interior of the outer pipe and to discharge the water from the inner pipe to the outside.

The lower cap may include: a first ring-shaped coupling part having a first support surface to support the lower end of the inner pipe, a discharging hole provided on a central portion of the first support surface to discharge the water from the inner pipe to the outside, with an internal thread provided on an inner surface of the discharging hole, and a first ring-shaped wall part protruded upward from the first support surface to engage with the lower end of the outer surface of the inner pipe; and a second ring-shaped coupling part, having a second support surface to support the lower end of the outer pipe, a feed hole provided on the second support surface, and a second ring-shaped wall part having a diameter greater than that of the first ring-shaped wall part of the first ring-shaped coupling part and protruded upward from the second support surface to engage with the lower end of the outer surface of the outer pipe.

The photocatalyst sterilizer may further include an annular groove provided on an inner surface of each of the first and second ring-shaped wall parts, and an O-ring seated in the annular groove.

The lower cap may have at a lower surface thereof a stepped shape.

The photocatalyst sterilizer may further include a base coupled to a pipe line and integrally provided on the lower end of the outer pipe, with a feed water inlet provided to communicate with the feed hole of the lower cap, and a clean water discharging hole provided to communicate with the discharging hole of the lower cap.

The photocatalyst-coated carrier may comprise a spherical cylindrical, spring-shaped or tube-shaped net.

The photocatalyst-coated carrier may be made by coating titanium oxide on an outer surface of a material selected from the group consisting of silica gel, silica alumina, zeolite, stainless steel, copper, nickel, silver, aluminium and silver-plated metals.

The photocatalyst-coated carrier may be made by coating the titanium oxide after eluting the outer surface of the selected material using an acid to a depth of 0.1 mm or less.

The photocatalyst-coated carrier may be produced through a heat treatment after being coated with the titanium oxide in which at least one material selected from the group constituting of platinum (Pt), silver (Ag), palladium (Pd), nickel (Ni), tin (Sn), chrome (Cr), iron (Fe) and magnesium (Mg) metals and oxides thereof is added within 0~5% of the titanium oxide.

The photocatalyst sterilizer or a part thereof may be immersed in water in a water tank of an appliance having a sterilizing function, so that the water contained in the water tank is fed into the outer pipe and is discharged to the outside while being sterilized by passing through the inner pipe.

The photocatalyst sterilizer may be vertically or horizontally installed in the water tank of the appliance.

The photocatalyst sterilizer may be installed around an outlet or a water feed pipe of an appliance having a sterilizing function, so that water, discharged from or fed into the appliance, is fed into the outer pipe and is discharged to the outside while being sterilized by passing through the inner pipe.

The photocatalyst sterilizer may be installed in a water tank of an appliance which has a sterilizing function and comprises the water tank to feed cold water, a cold water discharging pipe coupled to the water tank, with at least one cold water stopcock provided on an end of the cold water discharging pipe, a hot water tub coupled to the water tank, and a hot water discharging pipe coupled to the hot water tub, with at least one hot water stopcock provided on an end of the hot water discharging pipe. The discharging hole of the photocatalyst sterilizer may be coupled to the cold water discharging pipe, a first valve may be provided on the cold water discharging pipe, a connection pipe may couple the cold water discharging pipe to the hot water discharging pipe, a second valve may be provided on the connection pipe, and a sterilizing switch may control both the first valve and the second valve, so that, when the first valve is closed and the second valve is opened by the sterilizing switch, the cold water stopcock is sterilized by hot water.

Each of both the first valve and the second valve may comprise a solenoid valve or a directional control valve operated by a motor, and may be automatically or manually returned to an original state thereof when a desired time has passed after turning the sterilizing switch on.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, embodiments of the present invention will be described in detail with reference to the attached drawings.

Figure 1:
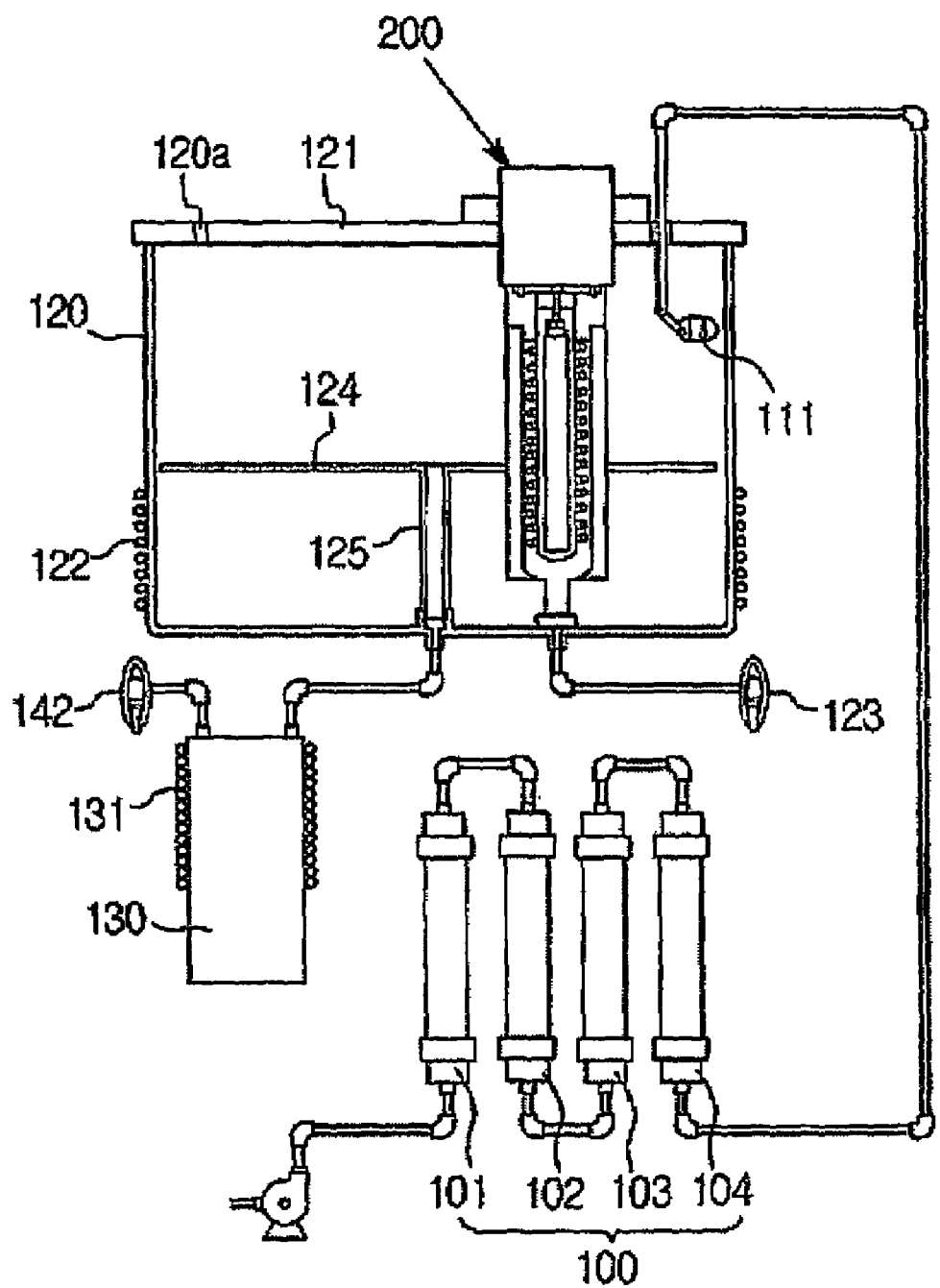
FIG. 1 is a view of a hot and cold water purifier having a photocatalyst sterilizer of the present invention.

As shown in FIG. 1, a photocatalyst sterilizer of the present invention is an enable water purifier. For example, the photocatalyst sterilizer is installed in a hot and cold water purifier which uses city water as a water source.

Referring to FIG. 1, the hot and cold water purifier includes a purifying filter unit 100 which purifies the city water by filtrating contaminants in the city water, and a water tank 120 which cools and stores the water supplied from the water tank 120 through a pipe coupled between the purifying filter unit 100 and the water tank 120. The hot and cold water purifier further includes a tank cover 121 of the water tank 120, and the photocatalyst sterilizer 200 according to an embodiment of the present invention which is installed into the water tank 120 through the tank cover 121 of the water tank 120 to sterilize the purified water using ultraviolet rays and through photocatalytic reactions. The hot and cold water purifier further includes a hot water tub 130 which is provided under the water tank 120 to heat the cold water supplied from the water tank 120 and store the water therein.

To sequentially filtrate the contaminants in the city water, the purifying filter unit 100 includes a sediment filter 101 which eliminates various dregs in the city water, such as soil, sand and etc., and a pre-carbon filter 102 which absorbs chlorine and organic compounds, which are molten in the city water, to eliminate them. The purifying filter unit 100 further includes an ultra filtration filter 103 which eliminates impurities from the city water while allowing the city water to contain therein various minerals, and a reverse osmosis membrane filter (not shown) which eliminates fine materials, such as a carcinogenic substance, a heavy metal, agicultural medicines and etc., floated on the city water. The purifying filter unit 100 further includes a post-carbon filter 104 which serves as a final step of filtering the city water, prevents bacilli from propagating, and eliminates odor, taste and a pigment material.

A cooling coil 122 is wound around an outer surface of the water tank 120 to cool the water contained in the water tank 120. A heating unit 131 is mounted on an outer surface of the hot water tub 130 to heat the water contained in the water tub 130. A cold water stopcock 123 and a hot water stopcock 142 are provided around the water tank 120 and the hot water tub 130 to discharge the cold water and the hot water, respectively. Each of the cold water stopcock 123 and the hot water stopcock 142 may comprise a plurality of stopcocks.

The water tank 120 has therein a dividing plate 124 to separate the water into the water to be cooled and the water to be heated. The water tank 120 further has therein a hot water inlet pipe 125 which is vertically inserted into a through hole provided on a predetermined portion of the dividing plate 124. The dividing plate 124 is provided to be spaced apart from an inner surface of the water tank 120 at a predetermined interval. A coupling hole is provided on the dividing plate 124 to allow the photocatalyst sterilizer 200 according to the embodiment to be vertically installed in the water tank 120. In FIG. 1, the reference numeral 111 denotes a water level control unit to control a water level in the water tank 120, and 120a denotes an air inlet.

Figure 2:
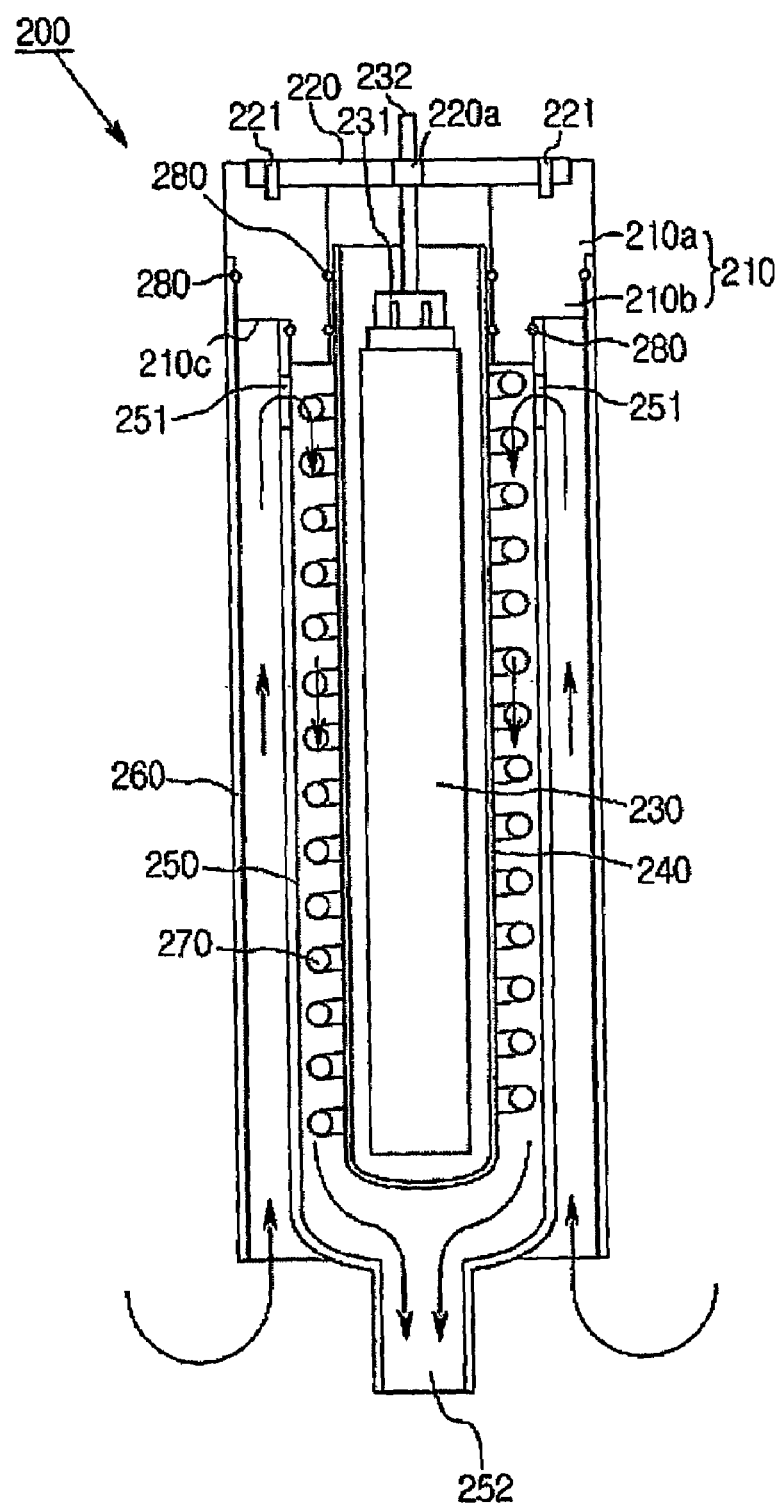
FIG. 2 is a sectional view of a photocatalyst sterilizer, according to an embodiment of the present invention.

As shown in FIG. 2, the photocatalyst sterilizer 200 of the present invention includes an upper cap 210 having a cylindrical shape, a quartz tube 210 with an UV lamp 230, an inner pipe 250, a photocatalyst-coated carrier 270 and an outer pipe 260.

The upper cap 210 is made of Teflon, a silicon rubber, a synthetic resin, stainless steel or aluminium. The upper cap 210 includes an upper cylindrical cap part 210a, and a lower cylindrical cap part 210b which has a diameter smaller than that of the upper cylindrical cap part 210a and is integrally provided under a lower end of the upper cylindrical cap part 210a. Due to the above-mentioned difference in the diameter, an outer stepped part 210c is formed on a junction between the upper and lower cylindrical cap parts 210a and 210b. A cover 220 is coupled to an upper end of the upper cap 210 by a plurality of coupling bolts 221 to close the upper cap 210. The cover 220 may be coupled to the upper cap 210 through a threaded engagement structure, as another embodiment shown in FIG. 4. That is, the upper cap 210 has a skirt part 222 with an internal thread. The upper cylindrical cap part 210a has an outer thread. Thus, the cover 220 is easily coupled to the upper cap 210 without any coupling bolt. Furthermore, the cover 220 may be integrally provided on the upper cylindrical cap part 210a through an injection molding process, but not shown in the attached drawings. In this case, it is not necessary to couple the cover 220 to the upper cap 210 using the coupling bolts 221 or through the threaded engagement structure.

As shown in FIG. 2, the cover 220 has an opening 220a to lead a power line 232, connected to a stabilizer 231 of the UV lamp 230 which will be described later herein, to the outside. The upper cap 210 is coupled to the tank cover 121 of the water tank 120, as shown in FIG. 1. Accordingly, the photocatalyst sterilizer 200 of the present invention is installed in the water tank 120 while being supported on the tank cover 121.

Referring to FIG. 2, the quartz tube 240 has therein the UV lamp 230 and is fastened at an upper end thereof in the upper cap 210. That is, the upper end of the quartz tube 240 is in close contact with an inner surface of the upper cylindrical cap part 210a, while an O-ring 280 is interposed between the quartz tube 240 and the upper cylindrical cap part 210a.

The inner pipe 250 opens upper and lower ends thereof to draw water through the upper end thereof and discharge the water through the lower end thereof. The inner pipe 250 is provided around an outer surface of the quart tube 240 to be spaced apart from each other at a predetermined interval. The inner pipe 250 is fastened at an upper end thereof in the upper cap 210. In detail, the inner pipe 250 is fastened to the upper cap 210 by another O-ring 280 interposed therebetween, while the upper end of the inner pipe 250 is in close contact with the outer surface of the lower cylindrical cap part 210b. In the embodiment, a plurality of water passing holes 251 are provided around the upper end of the inner pipe 250. A lower end of the inner pipe 250 has a diameter smaller than that of the quartz tube 240. At this time, the plurality of water passing holes 251 are positioned under a lower end of the lower cylindrical cap part 210b. Furthermore, the lower end of the inner pipe 250 is coupled to a discharging hole provided on a lower part of the water tank 120.

The outer pipe 260 is fastened at an upper end thereof in the upper cap 210 and is provided around an outer surface of the inner pipe 250 to be spaced apart from each other at a predetermined interval. At this time, the outer pipe 260 is fastened to the upper cap 210 by another O-ring 280 interposed therebetween, while an upper end of the outer pipe 260 is in close contact with the outer surface of the lower cylindrical cap part 210b. Preferably, the outer pipe 260 is arranged such that the lower end thereof is spaced apart from a bottom surface of the water tank 120 at an interval of 10~50 mm. The above-mentioned interval between the lower end of the outer pipe 260 and the bottom surface of the water tank 120 forms a gap to supply the water from the water tank 120 into the outer pipe 260.

Figure 4:
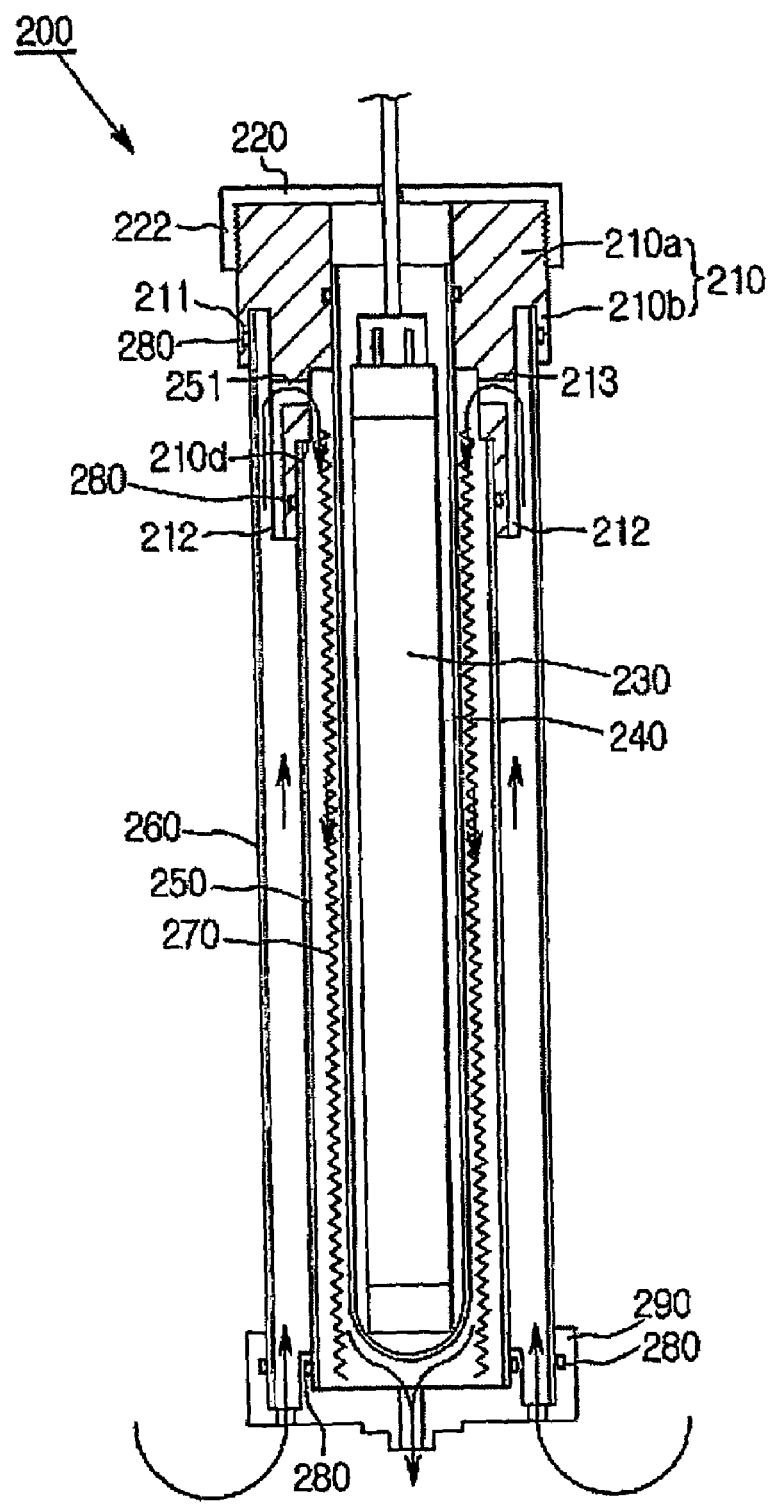
FIG. 4 is a sectional view of a photocatalyst sterilizer, according to another embodiment of the present invention.

As shown in FIG. 4, a skirt part 211 may extend downward from the lower end of the upper cylindrical cap part 210a while being spaced apart from the outer surface of the lower cylindrical cap part 210b at a predetermined interval, different from the above-mentioned structure of coupling the outer pipe 260 to the upper cap 210. Thus, the upper end of the outer pipe 260 is in close contact with an inner surface of the skirt part 211, with an O-ring 280 interposed between the outer pipe 260 and the skirt part 211.

The inner pipe 250 is preferably made of glass or a quartz material to have a light transmittance. The outer pipe 260 is preferably made of glass, quartz, stainless steel, silver, silver-plated metals or aluminium.

In case that the photocatalyst sterilizer 200 of the present invention shown in FIG. 2 is installed in the hot and cold water purifier, the water contained in the water tank 120 is supplied into the inner pipe 250 via the lower end of the outer pipe 260 and the plurality of water passing holes 251. The water supplied into the inner pipe 250 is sterilized by passing through the photocatalyst-coated carrier 270 which initiates a photolytic reaction using ultraviolet rays emitted from the UV lamp 230. Thereafter, the sterilized water is discharged through a water discharging hole 252 provided on the lower end of the inner pipe 250.

As shown in FIGS. 2 and 4, the photocatalyst-coated carrier 270 is provided between the quartz tube 240 and the inner pipe 250.

The photocatalyst-coated carrier 270 initiates the photolytic reaction through an oxidation-reduction reaction by the ultraviolet rays emitted from the UV lamp 230. The photocatalyst-coated carrier 270 is made by coating titanium oxide ($TiO_2$) on an inorganic material or a metal. For example, the photocatalyst-coated carrier 270 may be made by coating the titanium oxide on an outer surface of a material selected from the group consisting of spherical or cylindrical silica gel, silica alumina and zeolite.

Figure 3:
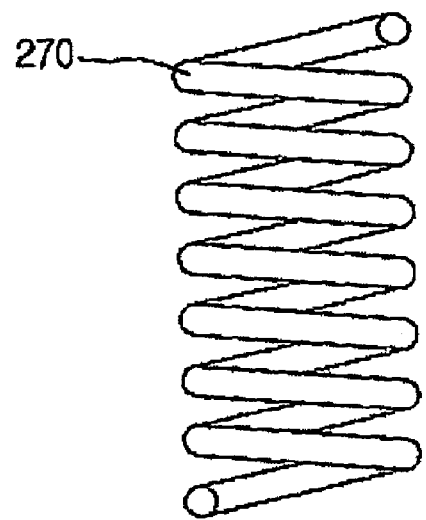
FIG. 3a is a front view showing an example of a photocatalyst-coated carrier constituting the photocatalyst sterilizer of the present invention.
FIG. 3b is a perspective view showing another example of the photocatalyst-coated carrier constituting the photocatalyst sterilizer of the present invention.
Figure 3:
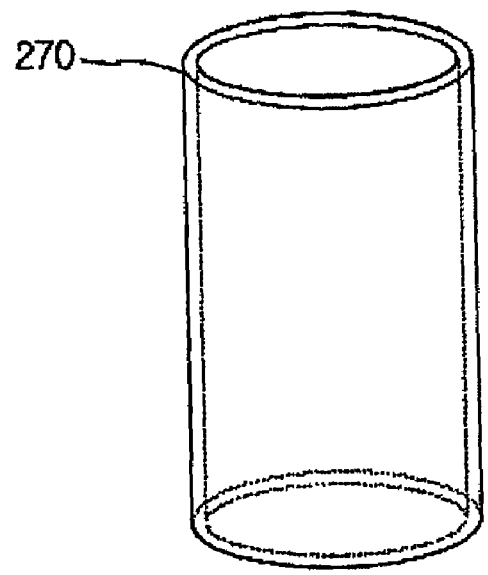

Furthermore, the photocatalyst-coated carrier 270 may be made of a spring-shaped (see, FIG. 3a) or cylindrical (see, FIG. 3b) metal, such as iron, nickel, stainless steel, copper, silver or aluminium, etc., so as to efficiently receive the ultraviolet rays and to increase a surface area which is in contact with the water. As shown in FIG. 3b, in case of the cylindrical photocatalyst-coated carrier 270, the photocatalyst-coated carrier 270 may have a rough surface by eluting the surface thereof using an acid to a depth of 0.1 mm or less. Furthermore, the photocatalyst-coated carrier 270 may comprise a tube-shaped net, as shown in FIG. 4. In this case, the photocatalyst-coated carrier 270 is inserted in the inner pipe 250 while wrinkling to form a zigzag-type pattern.

A photocatalyst material used in the photocatalyst-coated carrier 270 is not limited in the titanium oxide, but may be a material in which platinum, silver, palladium or nickel is added in the titanium oxide within 0~5% of the titanium oxide. Furthermore, an oxide, such as zinc oxide (ZnO) or stannic oxide ($SnO_2$), etc., may be used as the photocatalyst material, but preferably, the titanium oxide is used as the photocatalyst material. The photocatalyst material generates an electron band and an electron hole using the ultraviolet rays emitted from the UV lamp 230. The electron hole generates an hydroxy radical (OH—) by reacting with the water. The electron band gives an electron to an absorbed oxygen to generate superoxide ($O_2$). As a result, contaminated materials are dissolved into carbon dioxide ($CO_2$) and water ($H_2O$). In addition, a coenzyme involved in respiratory system in cell is eliminated. As such, the photocatalyst-coated carrier 270 has a sterilizing function.

In the meantime, the inner pipe 250 may be produced to have the following structure capable of efficiently drawing the water into the inner pipe 250.

Figure 5:
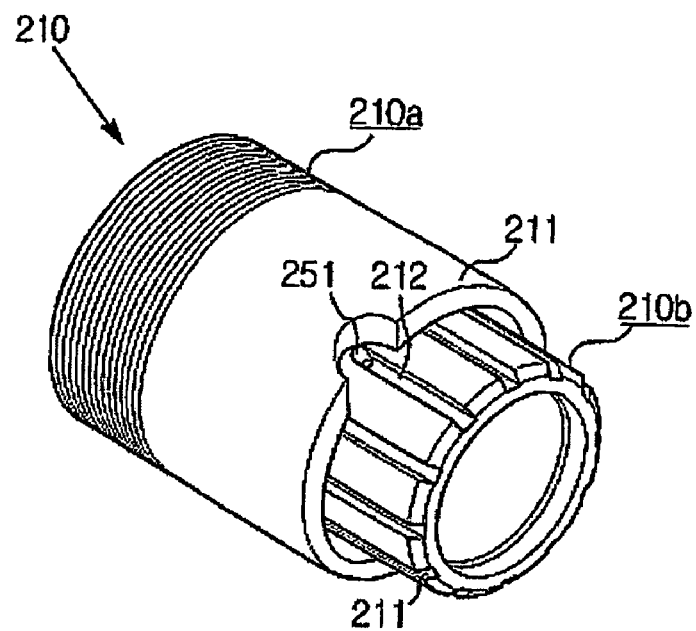
FIG. 5 is a partially broken perspective view showing an upper cap constituting the photocatalyst sterilizer of FIG. 4.

That is, as shown in FIGS. 4 and 5, the lower cylindrical cap part 210b includes a plurality of guide grooves 212 which are longitudinally provided around the outer surface of the lower cylindrical cap part 210b to be spaced apart from each other at predetermined intervals. The cylindrical cap part 210b further includes a water passing hole 251 which is provided on an upper end of each of the guide groves 212 to communicate the guide groove 212 with the upper end of the inner pipe 250. Preferably, at least ten water passing holes 251 are provided to increase the amount of the water supplied into the inner pipe 250, thus evenly dispersing the water to the photocatalyst-coated carrier 270. An inner stepped part 210d is provided under the water passing holes 251 on an inner surface of the lower end of the lower cylindrical cap part 201b. The inner pipe 250 has a longitudinal cylindrical shape with a constant diameter. The inner pipe 250 is fastened to the lower cylindrical cap part 210b by the O-ring 280, while the inner pipe 250 is in close contact at the upper end thereof with the inner stepped part 210d of the lower cylindrical cap part 210b.

In the photocatalyst sterilizer shown in FIG. 4, water, supplied into the outer pipe 260 through the lower end of the outer pipe 260, flows along the guide grooves 212 toward the water passing holes 251 of the lower cylindrical cap part 210b. Therefore a sufficient amount of water can be evenly supplied into the inner pipe 250 in a short time without channeling. By the above-mentioned water flowing structure, the amount of the water which is supplied into the inner pipe 250 is increased, while the water evenly flows without the channeling. Therefore, the photocatalyst sterilizer efficiently sterilizes the water. Furthermore, in case that the lower cylindrical cap part 210b has the water passing holes 251, desired numbers of the water passing holes 251 are easily provided, in comparison of case that the water passing holes 251 are provided on the brittle quartz tube 240. Therefore, when the water flows, the channeling is not caused. Thus, the sterilizing and purifying treatment is more efficiently accomplished. In the meantime, in case that the inner pipe 250 has the constant diameter while the water passing holes 251 are provided on the lower cylindrical cap part 210b, the inner pipe 250 can be easily produced. That is, the productivity of the inner pipe 250 may be increased by an automation system.

The photocatalyst sterilizer shown in FIG. 4 further includes a lower cap 290 which is provided under both the lower end of the inner pipe 250 and the lower end of the outer pipe 260 to feed the water into an interior of the outer pipe 260 and to discharge the water from the inner pipe 250 to the outside.

Figure 6:
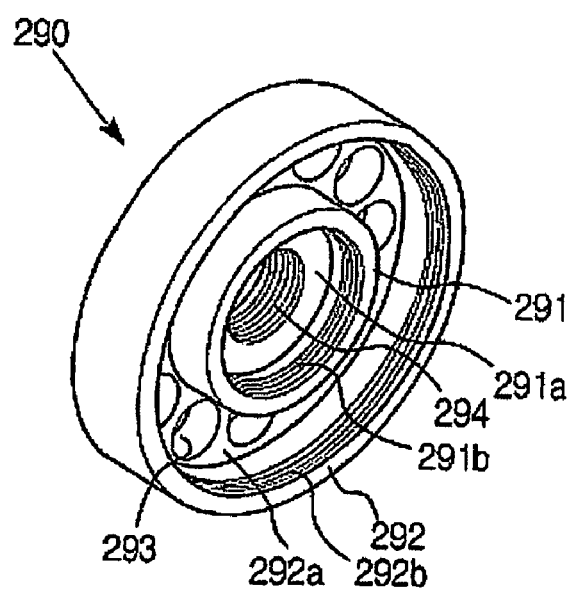
FIG. 6 is a perspective view showing a lower cap constituting the photocatalyst sterilizer of FIG. 4.

As shown FIG. 6, the lower cap 290 may be made of the same material as that described for the upper cap 210. The lower cap 290 includes a first ring-shaped coupling part 291. The first ring-shaped coupling part 291 comprises a first support surface 291a to support the lower end of the inner pipe 250. A discharging hole 294 is provided on a central portion of the first support surface 291a to discharge the water from the inner pipe 250 to the outside, with an internal thread provided on an inner surface of the discharging hole 294. A first ring-shaped wall part 291b is protruded upward from the first support surface 291a to engage with the lower end of the outer surface of the inner pipe 250. The lower cap 290 further includes a second ring-shaped coupling part 292. The second ring-shaped coupling part 292 comprises a second support surface 292a to support the lower end of the outer pipe 260. A feed hole 293 is provided on the second support surface 292a, while a second ring-shaped wall part 292b which has a diameter greater than that of the first ring-shaped wall part 291b of the first ring-shaped coupling part 291 is protruded upward from the second support surface 292a to engage with the lower end of the outer surface of the outer pipe 260.

Therefore, the lower cap 290 is fitted over the lower ends of both the inner pipe 250 and the outer pipe 260. As shown in FIG. 4, the lower cap 290 further includes an annular groove which is provided on an inner surface of each of both the first ring-shaped wall part 291b and the second ring-shaped wall part 292b, and an O-ring which is seated in the annular groove. Thus, the lower cap 290 is firmly fastened to both the inner pipe 250 and the outer pipe 260.

When the photocatalyst sterilizer 200 is installed in the water tank 120, the feed hole 293 of the lower cap 290 is spaced apart from the bottom surface of the water tank 120 at a predetermined interval. Thus, the water contained in the water tank 120 is smoothly supplied into the outer pipe 260.

The discharging hole 294 of the lower cap 290 is provided to discharge the water, which has been sterilized and purified in the inner pipe 250, to the outside of the water tank 120, for example, toward a cold water tub, a hot water tub 130 or the water stopcock which are provided under the water tank 120. The internal thread is provided on the inner surface of the discharging hole 294 of the lower cap 290. Therefore, the lower cap 290 is easily coupled to a discharging pipe which is protruded upward from the bottom surface of the water tank 120, different from the quartz tube 240 having the water discharging hole 252 into which the discharging pipe is inserted, as shown in FIG. 1.

That is, the discharging pipe is integrally protruded upward from the bottom surface of the water tank 120. The discharging pipe has on an outer surface thereof an outer thread. Thus, the discharging hole 294 of the lower cap 290 is coupled to the discharging pipe of the water tank 120 by the threaded engagement structure.

In this case, the lower cap 290 has at a lower surface thereof a stepped shape to be spaced apart from the bottom surface of the water tank 120 at a predetermined interval, while being coupled to the discharging pipe. In a detailed description, the lower surface of the lower cap 290 is stepped so that a part of the lower surface that corresponds to the first support surface 291a of the first ring-shaped coupling part 291 is lower than another part corresponding to the second support surface 292a of the second ring-shaped coupling part 292. A further part around a lower end of the discharging hole 294 is lower than the part corresponding to the first support surface 291a. Therefore, the part of the lower surface of the lower cap 290 corresponding to the second support surface 292a is spaced apart from the bottom surface of the water tank 120 at a predetermined interval. Thus, the water contained in the water tank 120 is smoothly drawn into a space, defined between the inner pipe 250 and the outer pipe 260, through the feed holes 293 of the second ring-shaped coupling part 292. Furthermore, a process of fastening the photocatalyst sterilizer 200 to the bottom surface of the water tank 120 is simplified, thus enhancing the manufacturability thereof.

Figure 7:
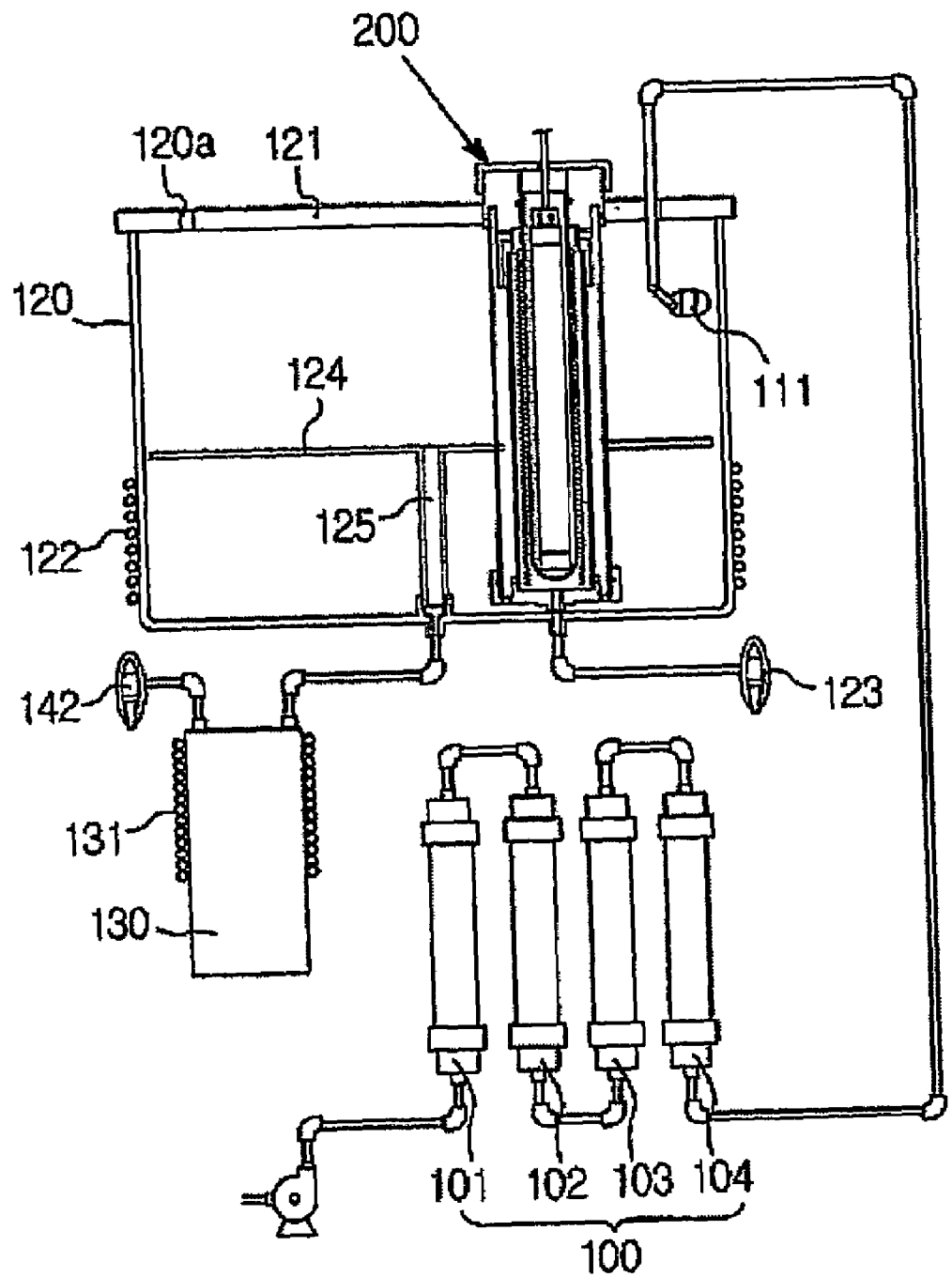
FIG. 7 is a view showing an example of a hot and cold water purifier having the photocatalyst sterilizer of FIG. 4.

When the photocatalyst sterilizer shown in FIG. 2 or 4 is installed in each of the hot and cold water purifiers shown in FIGS. 1 and 7, the water contained in the water tank 120 is supplied into the space, defined between the inner pipe 250 and the outer pipe 260, through the lower end of the outer pipe 260 or the feed holes 293 of the lower cap 290. Thereafter, the water is drawn into the inner pipe 250 through the water passing holes 251 (or through the guide grooves 212 and the water passing holes 251, in case that the guide grooves 212 are provided). Thus, the water drawn into the inner pipe 250 is sterilized by the photocatalyst reaction. In case that the water discharging holes 251 are provided on the upper cap 210, with the inner pipe 250 having the constant diameter, the photocatalyst sterilizer is easily adapted for mass production, thus increasing workability and productivity.

The photocatalyst sterilizer 200 of the present invention is used in the above-mentioned hot and cold water purifier to serve as an edible water purifier, in addition to a variety of appliances having sterilizing functions, for example, a hot and cold water generator, various edible water purifiers such as a street-pressure water supply system-type purifier, an aquarium and a large-sized hot and cold water purifier, which is placed in a public space. Furthermore, according to the above-mentioned purpose, the photocatalyst sterilizer 200 may be changed in a size thereof. For example, the UV lamp 230 may be changed in a capacity and a size thereof.

Hereinafter, examples of the appliances having the photocatalyst sterilizer 200 of the present invention will be described in detail with reference to the attached drawings. The same reference numerals are used throughout the different drawings to designate the same or similar components as those of the above-mentioned components, and further explanation of the above-mentioned components is thus not deemed necessary.

The photocatalyst sterilizer 200 of the present invention may be vertically installed in the hot and cold water purifier, as shown in FIGS. 1 and 7. Alternatively, the photocatalyst sterilizer 200 may be horizontally installed in the hot and cold water purifier according to the structure of the hot and cold water purifier, in the same manner as that of the photocatalyst sterilizer 200 installed in a hot and cold water generator of FIG. 8. In case of FIG. 8, a coupling hole is provided on a predetermined portion of a sidewall of a water tank 120. The photocatalyst sterilizer 200 is horizontally arranged through the coupling hole of the water tank 120. The discharging hole 294 of the lower cap 290 of the photocatalyst sterilizer 200 is coupled to a separate induction pipe which is coupled to a cold water stopcock.

Figure 8:
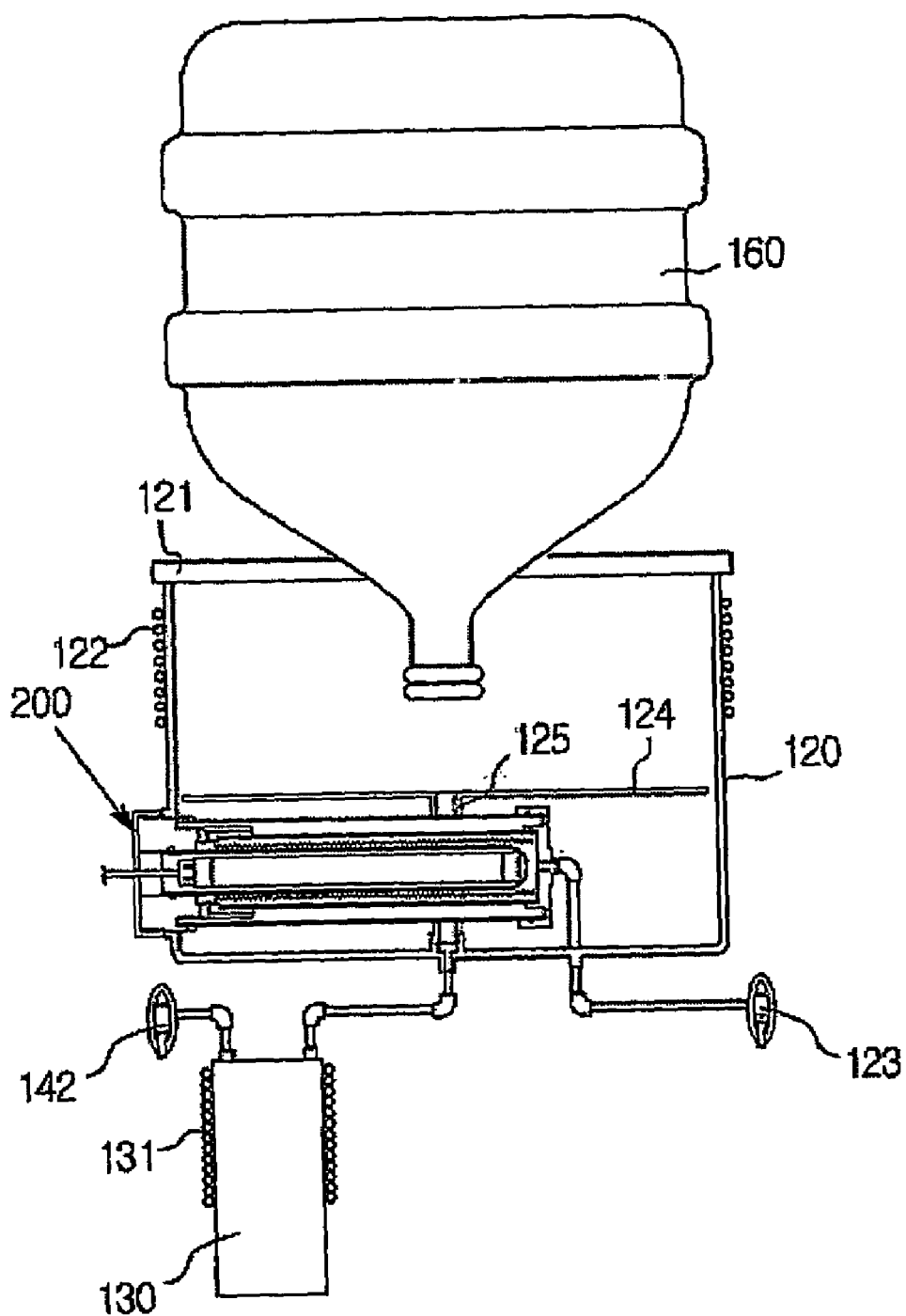
FIG. 8 is a view showing an example of a hot and cold water generator having the photocatalyst sterilizer of the present invention.

The operation of the hot and cold water generator of FIG. 8 is as follows. A raw water bottle 160 is reversely put on the water tank 120 such that an inlet of the raw water bottle 160 is inserted into an opening provided on a cover 220 of the water tank 120. Water, contained in the water tank 120 after being dropped from the raw water bottle 160 by the weight of the water, is sterilized and purified in the same manner as that described for the above-mentioned hot and cold water purifier. In the hot and cold water generator of FIG. 8, the photocatalyst sterilizer 200 of the present invention is horizontally installed in the water tank 120, but is not limited to this installation method. That is, the photocatalyst sterilizer 200 may be vertically installed in the water tank 120 according to the structure of the hot and cold water generator, as that of the above-mentioned hot and cold water purifier.

Figure 9:
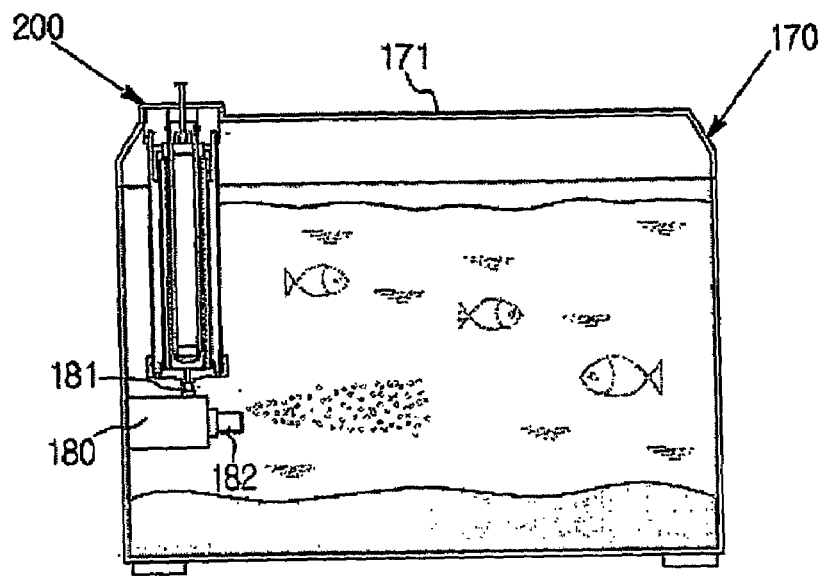
FIG. 9a is a view showing an example of an aquarium having the photocatalyst sterilizer of the present invention.
FIG. 9b is a view showing another example of the aquarium having the photocatalyst sterilizer of the present invention.
Figure 9:
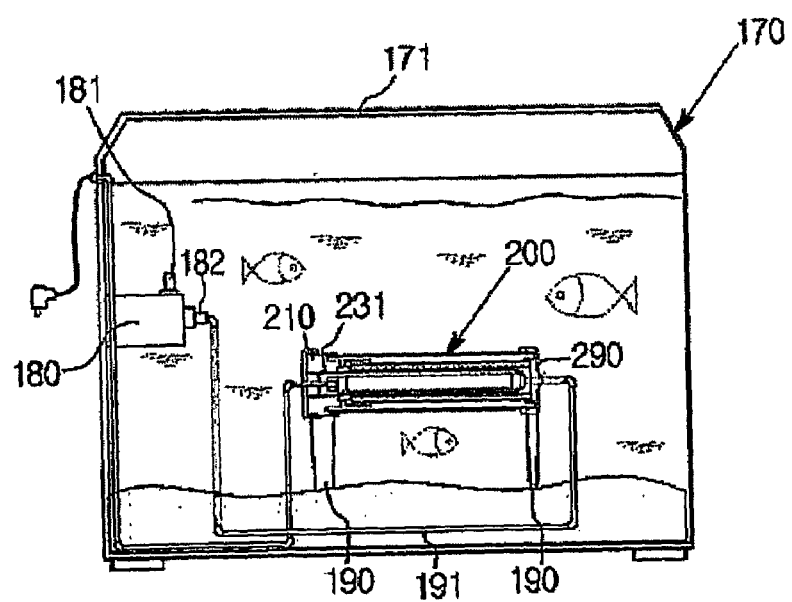

FIGS. 9a and 9b are views showing examples of aquarium 170 having the photocatalyst sterilizer 200 of the present invention. The photocatalyst sterilizer 200 of the present invention may be vertically installed in the aquarium 170, as shown in FIG. 9a and, alternatively, may be horizontally installed in the aquarium 170, as shown in FIG. 9b. As shown in FIG. 9a, in case that the photocatalyst sterilizer 200 is vertically installed in the aquarium 170, the upper end of the photocatalyst sterilizer 200 is exposed to the outside through a coupling hole provided on a cover 171 of the aquarium 170. The lower end of the photocatalyst sterilizer 200 is immersed in water contained in the aquarium 170. The lower cap 290 of the photocatalyst sterilizer 200 is coupled to a water inlet 181 of a submerged pump 180 in the aquarium 170. At this time, to couple the lower cap 290 to the water inlet 181 of the submerged pump 180, a coupling pipe (not shown) having an outer thread is connected to the water inlet 181 of the submerged pump 180 through an adapter (not shown). Thereafter, the discharging hole 294 of the lower cap 290 is coupled to the coupling pipe through a thread engagement.

When the submerged pump 180 is operated, the water contained in the aquarium 170 is drawn into the inner pipe 250 via both the outer pipe 260 and the plurality of water passing holes 251 by the pumping force of the submerged pump 180. Thereafter, the water, drawn into the inner pipe 250, is sterilized and purified by passing through the inner pipe 250. The sterilized and purified water is, thereafter, discharged into the aquarium 170 through a water outlet 182 of the submerged pump 180. Therefore, the water contained in the aquarium 170 is prevented from being contaminated. Even when the feed holes 293 of the lower cap 290 of the photocatalyst sterilizer 200 is coupled to the water outlet 182 of the submerged pump 180, the same result as the above-mentioned cases is obtained.

In a reverse way, the discharging hole 294 of the lower cap 290 may be coupled to the water outlet 182 of the submerged pump 180, so that the submerged pump 180 supplies the water, contained in the aquarium 170, into the inner pipe 250. Thus, the water is discharged from the inner pipe 250 to the aquarium 170 via both the outer pipe 260 and the feed holes 293 after being sterilized and purified in the inner pipe 250.

As shown in FIG. 9b, the photocatalyst sterilizer 200 of the present invention may be horizontally installed in the aquarium 170 to be completely immersed in the water. In this case, the flow of the water remains the same as the above-mentioned case, and firer explanation is thus not deemed necessary. However, to support the photocatalyst sterilizer 200 in the water, the photocatalyst sterilizer 200 may have at both ends thereof support legs 190. At this time, the upper cap 210 is integrated with the cover 220 n which the upper cap 210 is sealed into a single body. The upper cap 210 has at a central portion thereof the opening 220a to lead the power line, connected to the stabilizer 231 of the UV lamp 230, to the outside. To prevent a leakage of the water into the UV lamp 230, a conduit tube covering the power line is inserted into the opening 220a. Furthermore, an O-ring 280 is provided on an inner surface of the opening 220a, while the conduit tube is in close contact with the opening 220a. In addition, an aquarium cover 171, placed on an upper end of the aquarium 170, has at a predetermined portion thereof a lead hole. The conduit tube, which is inserted into the opening 220a of the upper cap 210, is led through the lead hole of the aquarium cover 171 to the outside of the aquarium 170, thus preventing a leakage of electricity.

As described above, the photocatalyst sterilizer 200 of the present invention can be used in water without any problem. Therefore, the photocatalyst sterilizer 200 does not require various components or pipes which have been used for fabricating a structure in that water contained in a conventional aquarium is sterilized after being discharged to the outside. Furthermore, the photocatalyst sterilizer 200 can solve the problems in that a user must connect the conventional pipes to the pump. In addition, the photocatalyst sterilizer 200 increases the sterilizing ability thereof.

Figure 10:
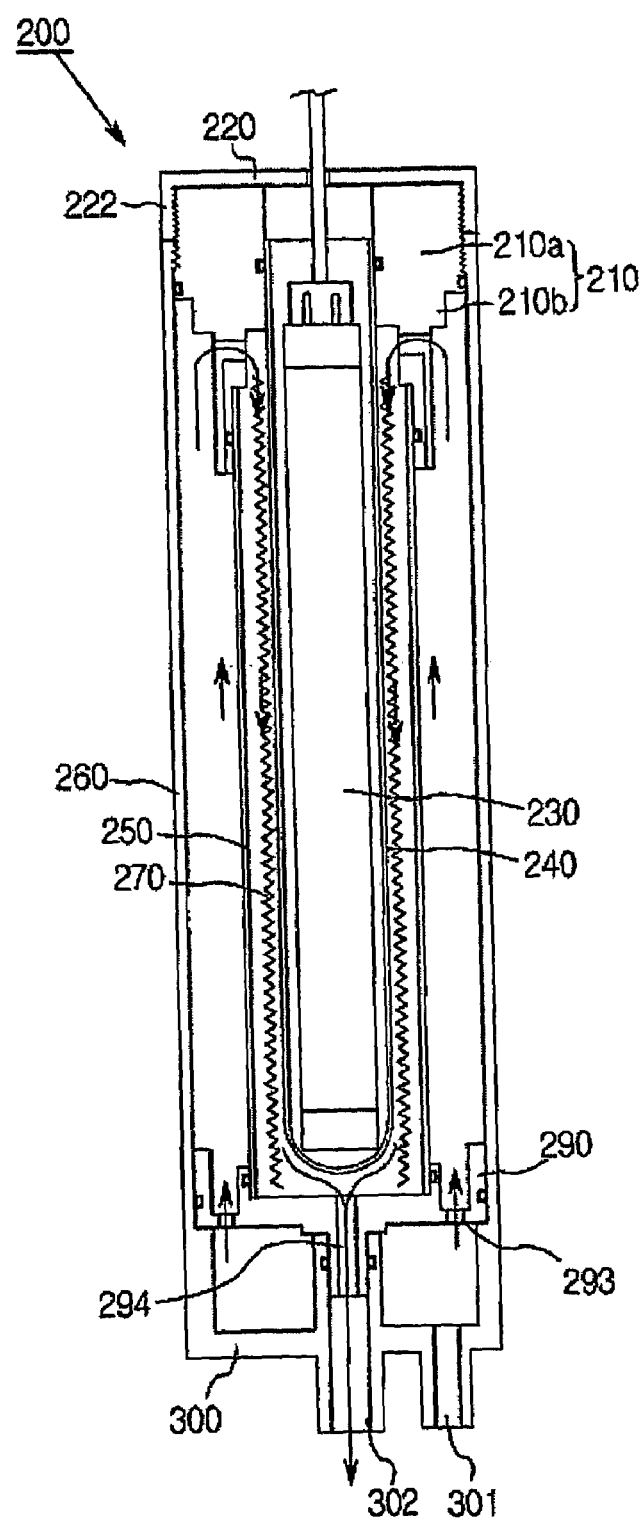
FIG. 10 is a sectional view of a photocatalyst sterilizer, according to a further embodiment of the present invention.

In the meantime, a photocatalyst sterilizer 200 according to a further embodiment to be used in a tap water purifier to be directly coupled to faucet pipe is shown in FIG. 10.

The photocatalyst sterilizer 200 according to this embodiment can solve the problems in that conventional filter cartridges used in the tap water purifiers must be frequently changed with new ones, thus reducing additional expenses.

In a detailed description, as shown in FIG. 10, the photocatalyst sterilizer 200 according to this embodiment further includes a base 300 which is coupled to a pipe line, such as a water service pipe. The base 300 comprises a feed water inlet 301 which is provided to communicate with a feed hole 293 of a lower cap 290, and a clean water discharging hole 302 which is provided to communicate with a discharging hole 294 of a lower cap 290. The base 300 may be integrally provided on the lower end of the outer pipe 260. In this embodiment, the upper end of the outer pipe 260 is preferably fitted over an outer surface of the upper cap 210 by engagement of inner and outer threads. In the same manner, the cover 220 is coupled to the upper cap 210. At this time, both a lower end of the cover 220 and the outer pipe 260 are in contact with each other while being coupled to the upper cap 210.

The photocatalyst sterilizer 200 of the tap water purifier is simply mounted on the water service pipe, so that the replacement process thereof with a new one is easy, as that of typical cartridges. As such, the photocatalyst sterilizer 200 according to this embodiment has the similar function as that of the conventional filter cartridges and, in addition, has superior sterilizing effect.

In the meantime, hot water is naturally sterilized of itself. Therefore, a hot water distribution valve (or the hot water stopcock 142) may not necessary to be separately sterilized, but the hot water stopcock is not shown in the drawings. However, a cold water distribution valve (or the cold water stopcock 123) may be infected with bacilli floating in the air and with bacilli by the hands of the users, contacts with peripheral devices. Therefore, the photocatalyst sterilizer 200 of the present invention may be installed on each of the cold water distribution valves of various edible water purifiers, such as the hot and cold water generators and the hot and cold water purifiers, so as to sanitarily maintain the cold water distribution valve.

Figure 11:
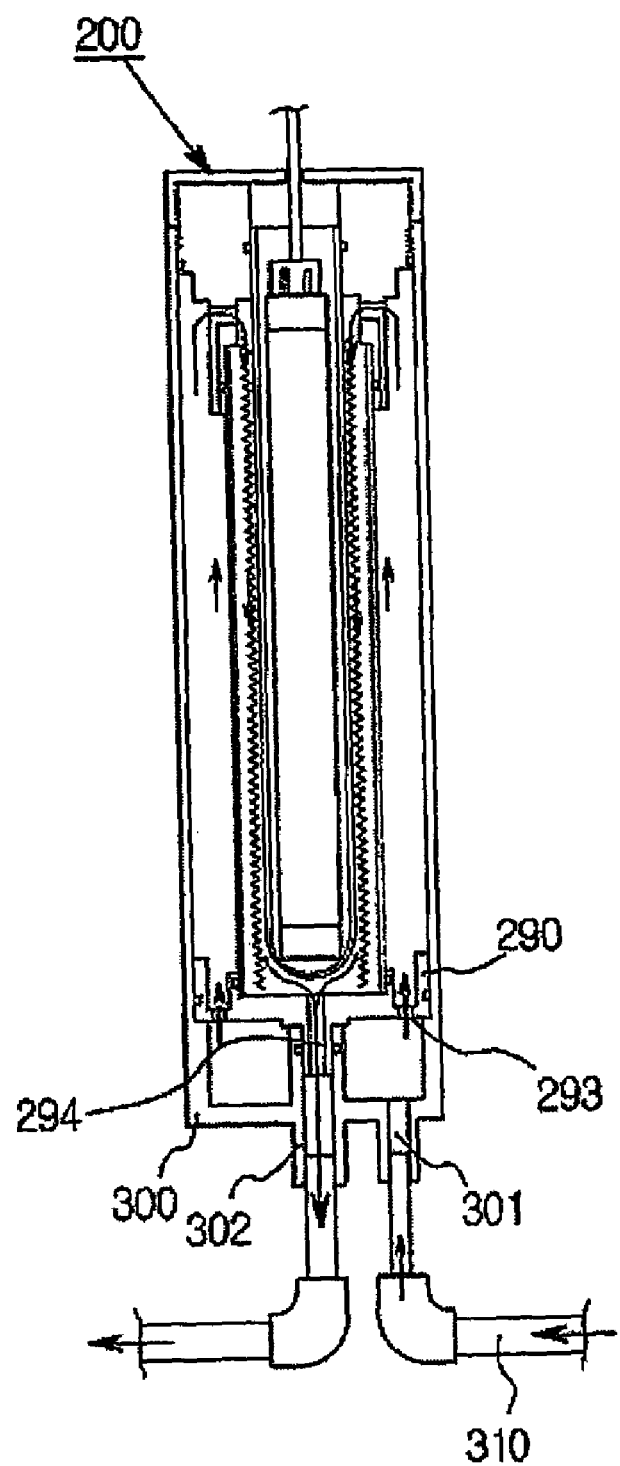
FIG. 11 is a sectional view showing the photocatalyst sterilizer of FIG. 10 mounted on a pipe line.

In addition, as shown in FIG. 11, the photocatalyst sterilizer 200 of the present invention may be installed on a predetermined portion of a water feed pipeline 310 of each of a variety of appliances, thus sterilizing water to be discharged from or fed into the appliances.

Figure 12:
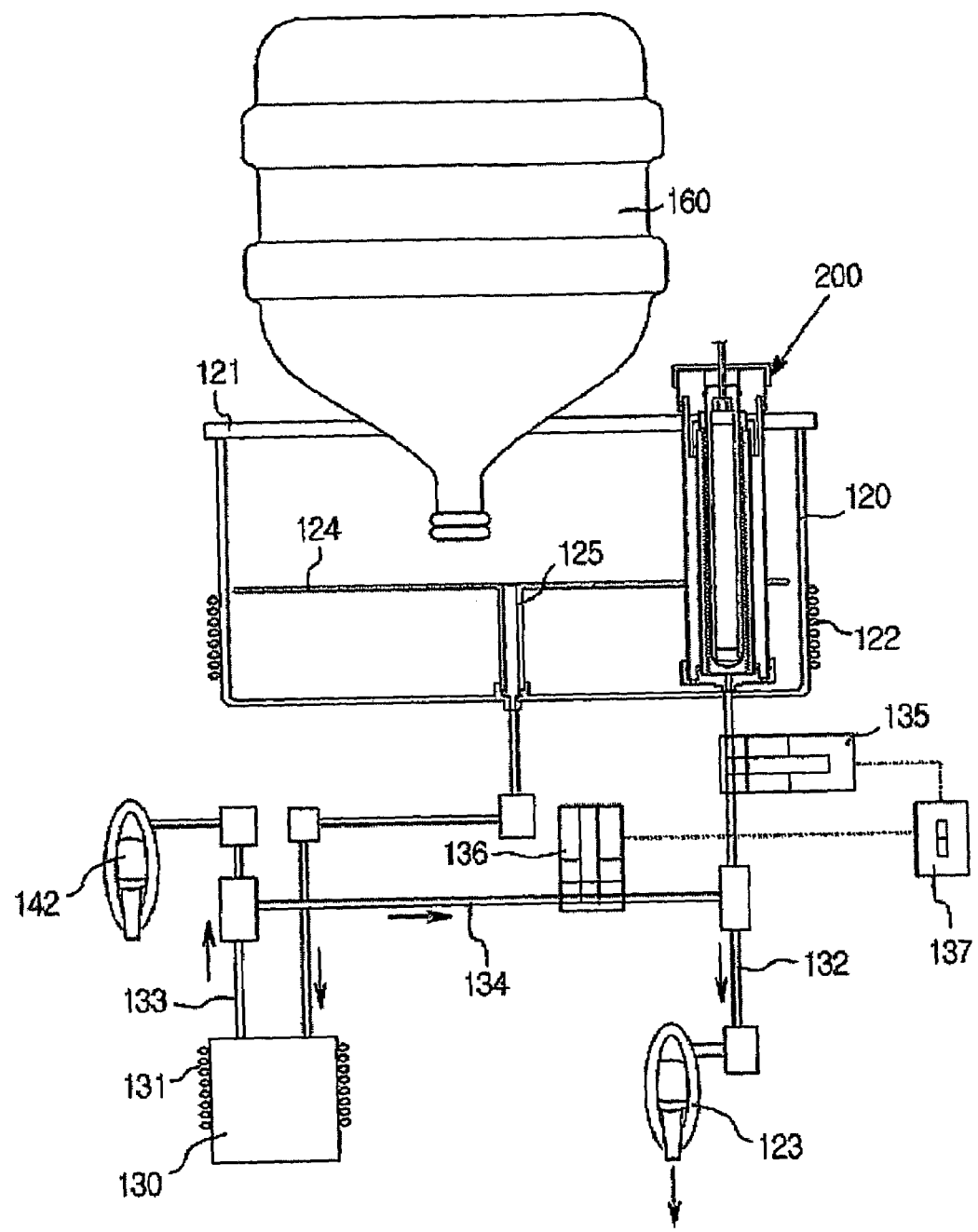
FIG. 12 is a view showing another hot and cold water generator which includes the photocatalyst sterilizer of the present invention and has a structure allowing for the sterilization of a cold water stopcock thereof.

FIG. 12 is a view showing another hot and cold water generator which includes the photocatalyst sterilizer 200 of the present invention and has a structure possible to sterilize a cold water stopcock 123 thereof using any one selected from the photocatalyst sterilizer 200 and hot water.

Figure 13:
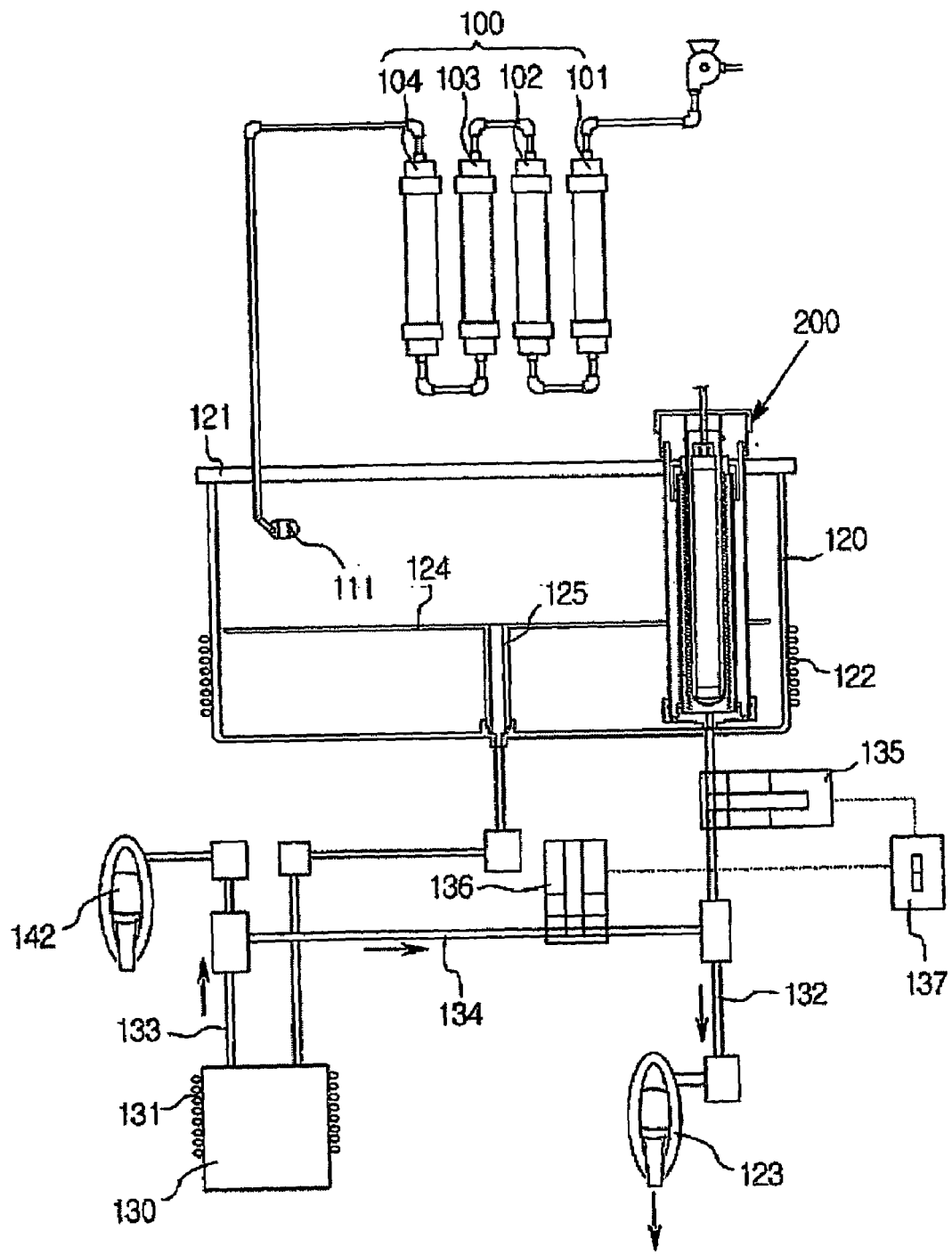
FIG. 13 is a view showing another hot and cold water purifier which includes the photocatalyst sterilizer of the present invention and has a structure allowing for the sterilization of a cold water stopcock thereof

FIG. 13 is a view showing another hot and cold water purifier which includes the photocatalyst sterilizer 200 of the present invention and has a structure possible to sterilize a cold water stopcock 123 thereof using any one selected from the photocatalyst sterilizer 200 and hot water.

As shown in each of FIGS. 12 and 13, the photocatalyst sterilizer 200 of the present invention is installed in a water tank 120 containing therein water to sterilize the water using the ultraviolet rays and through a phtocatalyst reaction. A discharging hole of the photocatalyst sterilize 200 is coupled to the cold water discharging pipe 132 which is connected to a cold water stopcock 132. A hot water discharging pipe 133, which is provided to supply the hot water from a hot water tub 130 to a hot water stopcock 142, is connected to the cold water discharging pipe 132 through a connection pipe 134. A first valve 135 is provided on the cold water discharging pipe 132. A second valve 136 is provided on the connection pipe 134. Both the first valve 135 and the second valve 136 are controlled by a sterilizing control switch 137.

While the sterilizing control switch 137 is not operated, the first valve 135 is opened and the second valve 136 is closed. Therefore, in the above state, the user may selectively use hot water and cold water. In reverse, when the sterilizing switch 137 is turned on, first valve 135 is closed and the second valve 136 is opened. Therefore, the cold water discharging pipe 132 is closed by the first valve 135, so that the cold water cannot be discharged through the cold water stopcock 123, while the hot water can be discharged through both the hot water stopcock 142 and the cold water stopcock 123. At this time, the cold water stopcock 123 is sterilized by the hot water discharged therethrough.

Each of both the first valve 135 and the second valve 136 may comprise a solenoid valve or a directional control valve operated by a motor. Each of both the first valve 135 and the second valve 136 may be automatically or manually returned to an original state thereof when a desired time has passed after turning the sterilizing control switch 137 on.

As such, in the hot and cold water generator or the hot and cold water purifier having the photocatalyst sterilizer 200, the cold water is efficiently sterilized. Furthermore, the water stopcock 123, which may be easily contaminated, is sterilized by the hot water.

INDUSTRIAL APPLICABILITY

As described above, the present invention provides a photocatalyst sterilizer which efficiently sterilizes water, polluted by bacilli and various organic substances, using violet rays and through a photocatalyst reaction. Furthermore, a sufficient amount of water is evenly supplied to a photocatalyst-coated carrier provided in the photocatalyst sterilizer. Thus, a water sterilizing ability of the photocatalyst sterilizer is more enhanced.

In addition, the photocatalyst sterilizer may be simply installed in each of a variety of appliances or on places where water must be sterilized prior to being supplied to users, and may be further installed to be immersed in water in the appliance or on a place having water. Furthermore, the photocatalyst sterilizer may be mounted in a water outlet of such an appliance, such as a water stopcock, a water distribution valve of an enable water purifier and etc., or may be directly mounted on a water feed pipeline. As such, the range of application of the photocatalyst sterilizer is wide.

Moreover, in case of an enable water purifier which efficiently sterilizes cold water using the photocatalyst sterilizer of the present invention and sterilizes a cold water stopcock using hot water, the user can reliably use the enable water purifier.

Furthermore, in case that a photocatalyst sterilizer includes a lower cylindrical cap part with a water passing hole and an inner pipe with a constant diameter, the manufacturability of the photocatalyst sterilizer is improved. Therefore, the photocatalyst sterilizer is easily adapted for mass production, thus increasing the productivity thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A photocatalyst sterilizer, comprising:
    an upper cap having a cylindrical shape, comprising an upper cylindrical cap part, and a lower cylindrical cap part having a diameter smaller than that of the upper cylindrical cap part and integrally provided under a lower end of the upper cylindrical cap part;
    a quartz tube fastened at an upper end thereof in the upper cap, with an UV (ultraviolet) lamp provided in the quartz tube;
    an inner pipe fastened at an upper end thereof in the upper cap and provided around an outer surface of the quartz tube to be spaced apart from each other at a predetermined interval, so as to discharge water, fed from the upper end thereof, through a lower end thereof to an outside of the inner pipe;
    a photocatalyst-coated carrier provided between the quartz tube and the inner pipe; and
    an outer pipe fastened at an upper end thereof in the upper cap and provided around an outer surface of the inner pipe to be spaced apart from each other at a predetermined interval, so as to feed water, drawn through a lower end thereof, to the upper end of the inner pipe, wherein the outer pipe is configured to flow water substantially unhindered.

2. The photocatalyst sterilizer according to claim 1, wherein the lower cylindrical cap part comprises:

a plurality of guide grooves longitudinally provided around an outer surface of the lower cylindrical cap part to be spaced apart from each other at predetermined intervals;

a water passing hole to communicate each of the plurality of guide grooves with the upper end of the inner pipe; and an inner stepped part provided under the water passing holes on a lower end of an inner surface of the lower cylindrical cap part, and the inner pipe has a longitudinal cylindrical shape with a constant diameter and is in close contact at the upper end thereof with the inner stepped part.

3. The photocatalyst sterilizer according to claim 1, further comprising:

a skirt part extending downward from a lower end of the upper cylindrical cap part while being spaced apart from the outer surface of the lower cylindrical cap part at a predetermined interval, so that an upper end of the outer pipe is in close contact with an inner surface of the skirt part.

4. The photocatalyst sterilizer according to claim 1, further comprising:

a lower cap provided under both the lower end of the inner pipe and the lower end of the outer pipe to feed the water into an interior of the outer pipe and to discharge the water from the inner pipe to the outside.

5. The photocatalyst sterilizer according to claim 4, wherein the lower cap comprises:

a first ring-shaped coupling part, comprising a first support surface to support the lower end of the inner pipe, a discharging hole provided on a central portion of the first support surface to discharge the water from the inner pipe to the outside, with an internal thread provided on an inner surface of the discharging hole, and a first ring-shaped wall part protruded upward from the first support surface to engage with the lower end of the outer surface of the inner pipe; and a second ring-shaped coupling part, comprising a second support surface to support the lower end of the outer pipe, a feed hole provided on the second support surface, and a second ring-shaped wall part having a diameter greater than that of the first ring-shaped wall part of the first ring-shaped coupling part and protruded upward from the second support surface to engage with the lower end of the outer surface of the outer pipe.

6. The photocatalyst sterilizer according to claim 5, further comprising:

an annular groove provided on an inner surface of each of the first and second ring-shaped wall parts; and an O-ring seated in the annular groove.

7. The photocatalyst sterilizer according to claim 5, wherein, in case that the photocatalyst sterilizer is used in an appliance having a sterilizing function, the lower cap has at a lower surface thereof a stepped shape to be spaced apart from a bottom surface of a water tank of the appliance at a predetermined interval, and the discharging hole of the lower cap is coupled to a discharging pipe of the appliance by the internal thread provided on the inner surface of the discharging hole.

8. The photocatalyst sterilizer according to claim 5, further comprising: a base coupled to a pipe line and integrally provided on the lower end of the outer pipe, with a feed water inlet provided to communicate with the feed hole of the lower cap, and a clean water discharging hole provided to communicate with the discharging hole of the lower cap.

9. The photocatalyst sterilizer according to claim 1, wherein the photocatalyst-coated carrier comprises a spherical, cylindrical, spring-shaped or tube-shaped net.

10. The photocatalyst sterilizer according to claim 1, wherein the photocatalyst-coated carrier is made by coating titanium oxide on an outer surface of a material selected from the group consisting of silica gel, silica alumina, zeolite, stainless steel, copper, nickel, silver, aluminium and silver-plated metals.

11. The photocatalyst sterilizer according to claim 10, wherein the photocatalyst-coated carrier is made by coating the titanium oxide after eluting the outer surface of the selected material using an acid to a depth of 0.1 mm or less.

12. The photocatalyst sterilizer according to claim 10, wherein the photocatalyst-coated carrier is produced through a heat treatment after being coated with the titanium oxide in which at least one material selected from the group constituting of platinum (Pt), silver (Ag), palladium (Pd), nickel (Ni), tin (Sn), chrome (Cr), iron (Fe) and magnesium (Mg) metals and oxides thereof is added within 0–5% of the titanium oxide.

13. The photocatalyst sterilizer according to claim 1, wherein the inner pipe is made of glass or a quartz material, and the outer pipe is made of one of glass, quartz, stainless steel, silver, silver-plated metals and aluminium.

14. The photocatalyst sterilizer according to claim 1, wherein the photocatalyst sterilizer or a part thereof is immersed in water in a water tank of an appliance having a sterilizing function, so that the water contained in the water tank is fed into the outer pipe and is discharged to the outside while being sterilized by passing through the inner pipe.

15. The photocatalyst sterilizer according to claim 14, wherein the photocatalyst sterilizer is vertically or horizontally installed in the water tank of the appliance.

16. The photocatalyst sterilizer according to claim 1, wherein the photocatalyst sterilizer is installed around an outlet or a water feed pipe of an appliance having a sterilizing function, so that water, discharged from or fed into the appliance, is fed into the outer pipe and is discharged to the outside while being sterilized by passing through the inner pipe.

17. The photocatalyst sterilizer according to claim 1, wherein the photocatalyst sterilizer is installed in a water tank of an appliance which has a sterilizing function and comprises the water tank to feed cold water, a cold water discharging pipe coupled to the water tank with at least one cold water stopcock provided on an end of the cold water discharging pipe, a hot water tub coupled to the water tank and a hot water discharging pipe coupled to the hot water tub, with at least one hot water stopcock provided on an end of the hot water discharging pipe, wherein a discharging hole of the photocatalyst sterilizer is coupled to the cold water discharging pipe;

a first valve is provided on the cold water discharging pipe;

a connection pipe couples the cold water discharging pipe to the hot water discharging pipe;

a second valve is provided on the connection pipe; and a sterilizing switch controls both the first valve and the second valve, so that, when the first valve is closed and the second valve is opened by the sterilizing switch, the cold water stopcock is sterilized by hot water.

18. The photocatalyst sterilizer according to claim 17, wherein each of both the first valve and the second valve comprises a solenoid valve or a directional control valve operated by a motor, and is automatically or manually returned to an original state thereof when a desired time has passed after turning the sterilizing switch on.

* * * * *